United States Patent [19]

Mitchell

[11] Patent Number: 4,711,033
[45] Date of Patent: Dec. 8, 1987

[54] APPARATUS FOR AND METHOD OF SETTING THE HEIGHT OF A DESK CHAIR

[76] Inventor: Peter P. Mitchell, 210 Sylvan Dr., Englewood Cliffs, N.J. 07632

[21] Appl. No.: 947,902

[22] Filed: Dec. 29, 1986

[51] Int. Cl.⁴ .............................................. G01B 5/00
[52] U.S. Cl. .................................................. 33/169 R
[58] Field of Search ....................... 33/169 R, 161, 170

[56] References Cited

U.S. PATENT DOCUMENTS 535,287 3/1895 Hill ..................................... 33/169 R Primary Examiner—Harry N. Haroian
Attorney, Agent, or Firm—Andrew M. Wilford

[57] ABSTRACT

An apparatus for setting the height of a desk chair for a person has a base adapted to stand on the floor, a guide fixed to and extending vertically up from the base, a support vertically slidable in the guide, and a clamp that can arrest the suport in the guide at any of a multiplicity of vertically offset positions therealong. A rigid arm extends horizontally from the support and has an outer end displaceable between a horizontal position nested in the arm and a vertical position depending straight down from the arm outer end and having a lower end 1in to 2in below the outer end of the arm in the vertical position.

9 Claims, 2 Drawing Figures

APPARATUS FOR AND METHOD OF SETTING THE HEIGHT OF A DESK CHAIR

FIELD OF THE INVENTION

The present invention relates to an apparatus for setting the height of a desk chair. More particularly this invention concerns a gauge assembly that allows a person to set the height of his or her desk chair for him or herself, that is so that the chair is set at the ideal height for the user's anatomy.

BACKGROUND OF THE INVENTION

It has been found that a worker at a computer workstation can be more productive and can be expected to be absent less than one who is uncomfortable. A particular problem is presented by the worker's chair which is normally adjustable two ways: the heights of the seat cushion and of the back rest can be changed and fixed at any level.

The height of the backrest is quickly established by the worker for lower-back support. Normally this adjustment can be made easily, since a too high or too low backrest is clearly uncomfortable.

The seat height is, however, quite a bit harder to establish. The best seat height has been determined by the science of ergonomics to be a function of the length of a person's lower leg, including any shoe worn. The seat height must be a predetermined distance below the axis of the knee joint so that the upper legs can be fairly level, the lower legs vertical, and both feet flat on the floor. This position has been found to be the least stressful for the person in the chair and encourages proper posture so that fatigue is minimized.

Unfortunately this dimension is not normally known, like a person's height, and requires a yardstick or the like to determine. Even taking this measurement is not something one can do oneself, and it in fact requires a trained person to ascertain the correct chair height. Once the ideal chair height is determined, the measuring tool must be employed again to set the chair.

OBJECTS OF THE INVENTION

It is therefore an object of the present invention to provide an improved apparatus for setting the height of a desk chair for a person.

Another object is the provision of such an apparatus for setting the height of a desk chair for a person which allows an individual to readily determine and set the correct chair height for his particular leg structure.

A further object is to provide and improved method of setting the height of a seat of a chair using the apparatus of this invention.

SUMMARY OF THE INVENTION

An apparatus for setting the height of a desk chair for a person according to the invention has a base adapted to stand on the floor, a guide fixed to and extending vertically up from the base, a support vertically slidable in the guide, and a clamp that can arrest the support in the guide at any of a multiplicity of vertically offset positions therealong. A rigid arm extends horizontally from the support and has an outer end displaceable between a horizontal position nested in the arm and a vertical position depending straight down from the arm outer end and having a lower end 1 in to 2 in below the outer end of the arm in the vertical position.

The method of this invention therefore comprises the steps of sequentially first setting the base on the floor adjacent the person whose chair is to be set with the element in the horizontal nested position and the person standing. Then the clamp is released, the support is vertically displaced until the arm outer end is substantially level with the center of the kneecap of the person, and then the clamp is engaged to lock the support in the guide. The gauge element is then moved into the vertical depending position and the front edge of the seat of the chair to be adjusted is put—either by moving the apparatus to the chair or the chair to the apparatus—under the outer end of the arm, all without changing the setting of the support in the guide. Finally the seat of the chair is moved by whatever mechanism does this for the chair in question until its front edge just engages the depending tip of the element. This places the chair surface the ergonomically ideal distance of about 1.8 in below the kneecap center, so that the person sitting in the chair will have his or her lower legs vertical with both feet flat on the floor.

According to another feature of this invention the arm has an inner end and the support has an upper end provided with an arm pivot connecting it to the inner arm end. The arm is pivotal at its arm pivot between a use position generally perpendicular to the post and a storage position aligned therewith and nested therein. The guide includes a pair of guide rails and the support is a bar vertically slidable between the rails and the arm is between the rails in the storage position. Thus the entire system can be folded up into a fairly compact unit.

The bar according to this invention has a lower end provided with the clamp which includes a spring-loaded pressure pad normally bearing in one direction against the rails and effectively pressing the lower end of the bar in the opposite direction against the rails. The rails are of C-section and open toward each other and the bar is engaged between the rails. Furthermore the outer arm end is formed with an outwardly open notch having a beveled base. The gauge element has a beveled end complementarily engageable with the base and substantially fills the notch with the beveled end and base in flat engagement in the horizontal position. Thus it is possible to use the apparatus, with the gauge element nested, to set keyboard height also by setting the arm outer end at the crook of the elbow of the person sitting in the properly adjusted chair, and then moving the keyboard up or down until the thus set arm outer end just touches the home key row.

DESCRIPTION OF THE DRAWING

The above and other features and advantages will become more readily apparent from the following, reference being made to the accompanying drawing in which.

SPECIFIC DESCRIPTION

Figure 1:
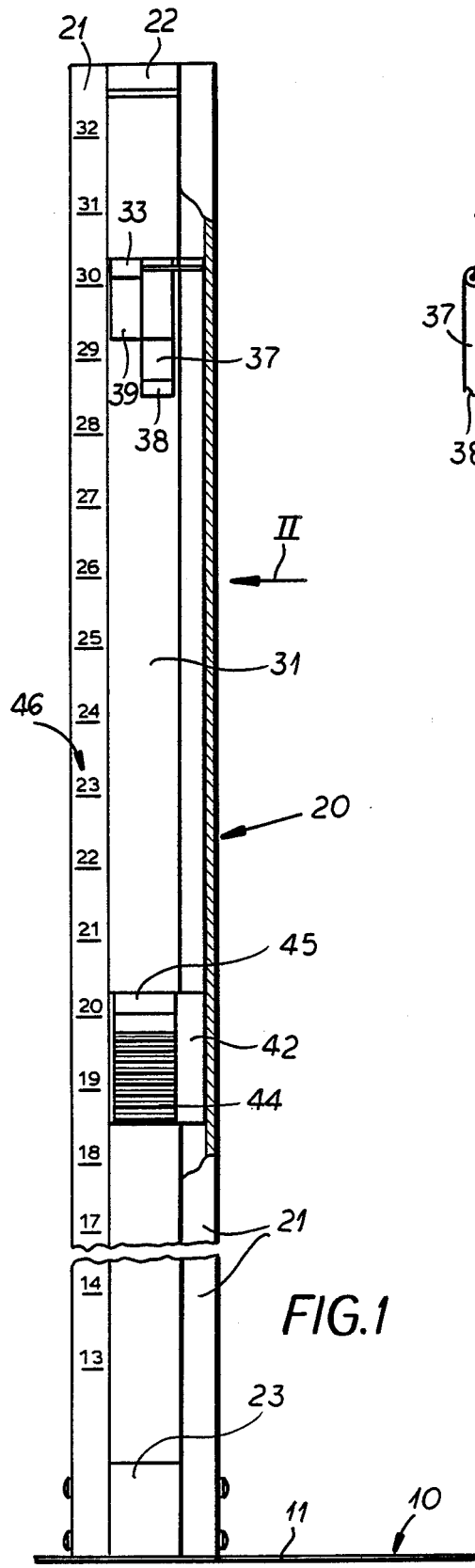
FIG. 1 is a small-scale and partly sectional front view of the apparatus according to this invention.
Figure 2:
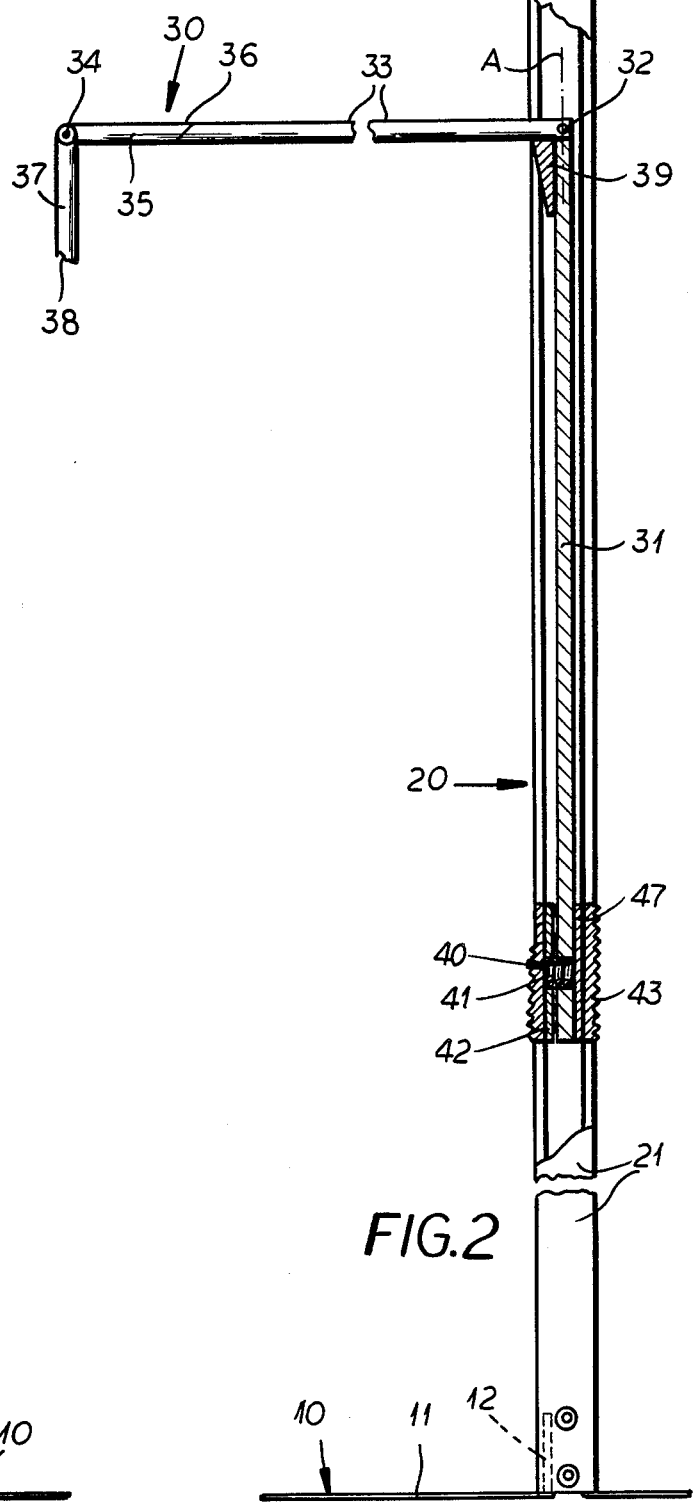
FIG. 2 is a partly sectional side view of the apparatus, taken in the direction of arrow II of FIG. 1.

As seen in the drawing the apparatus basically comprises a base 10, a post 20, and an outrigger gauge assembly 30. These parts all come apart and/or fold up so that the whole apparatus can be packaged compactly.

The base 10 comprises two identical triangular floor plates or feet 11 made of sheet aluminum and having respective upwardly projecting tabs 12 that fit snugly into the lower end of the post 20. The base 10 supports the post 20 so its longitudinal axis A is vertical relative to a horizontal floor surface on which the base 10 is standing.

The post 20 is formed of two aluminum channels or guide rails 21 that are open toward each other and that are bridged at their tops by a strap 22 and at their bottoms by a spacer 23 so that the flank and extend parallel to the axis A. The overall height of the post 20 is about 23 in.

The gauge assembly 30 of this invention has a rectangular-section and straight slide bar 31 about 1 ft long and having an upper end formed with a notch bridged by a horizontal pivot pin 32 extending in the vertical symmetry plane of the two rails 21. The inner end of an outrigger arm 33 which is narrower measured parallel to the pin 32 than the spacing between the guide rails 21 is pivoted on this pin 32 so that this arm 33 can pivot between the illustrated horizontal position extending perpendicular to the axis A from the post 20 to a storage position extending along the axis A and nested between the channel rails 21. In the horizontal position the arm 33 rests on a support wedge 39 fixed to the front face of the upper end of the bar 31 immediately below the notch receiving the inner end of the arm 33.

The outer end of the arm 33 is provided with a pivot pin 34 projecting horizontally parallel to the pin 32 and is formed with a notch 35 having a beveled rear end 36. A gauge finger 37 is pivoted on the pin 34, has a beveled outer end 38, and can move between the illustrated position depending vertically down from the arm 33 and a position horizontally nested in the notch 35, with the bevels 36 and 38 flatly against each other.

The bar 31 fits between the flanges of the channel guides 21 so that it can slide axially therealong. Fixed to the rear face of the lower end of the bar 31 is a rectangular pressure plate 47 that bears backward against the rear flanges of both channel guides 21. A compression spring 40 loosely received in a front-to-back throughgoing bore 41 formed in the lower end of the bar 31 has a rear end bearing back perpendicular to the axis on the pressure plate 47 and a front end received in a shallow blind pocket of a front pressure plate 42 like the back plate 47 but pressed forward against the inner faces of the front flanges of the rails 21. The plates 47 and 42 carry respective push pads 43 and 44 that project somewhat out between the rails 21 and that have horizontally ridged surfaces. In addition the front plate 42 carries an indicator block 45 that aligns with indicia 46 on one of the rails 21 to show the actual distance from ground (here in inches) of the plane of the arm 33 when extended.

All the parts of the gauge assembly 30 except the pivot pins 32 and 34, the push pads 43 and 44, and the spring 40 are made of a durable synthetic resin such as acrylic. The pins 32 and 34 are of steel and the blocks 43 and 44 of an elastomer such as rubber. Most joints are made by solvent-type adhesives.

The apparatus described above is used as follows to set the height of a desk chair:

First of all the feet 11 are fixed in the lower end of the post 20 and the arm 33 is swung out, but the finger 37 is left nested in the notch 35 of this arm 33. The apparatus is stood in front of the person whose chair is to be adjusted, this person standing. The clamp is released by pinching together the pads 43 and 44 and then the gauge assembly 30 is raised or lowered until the outer end of the arm 33 just touches or is level with the center of the kneecap of the person, whereupon the pads 43 and 44 are released to clamp the assembly 30 at this height. This measurement is done with the person wearing shoes of the height normally worn while sitting at the chair.

The finger 37 is then pivoted out and the apparatus is moved to the person's chair which is adjusted up or down until the outer end of the depending finger 37 just touches the top of the extreme front edge of the seat cushion. This therefore sets the cushion slightly less than about 1.8 in below the center of the user's patella. Thus when the person for whom the chair is set sits in the chair, his or her lower legs will be nearly perfectly vertical and both feet will be flat on the floor.

It is also possible to use the device of this invention to set the keyboard height for the person at the ergonomically ideal level. This is done once the seat is set as described above by first flipping the finger 37 back into the notch 35 of the arm 33, and then raising the gauge assembly 30 until the tip of the arm 33 touches or is just level with the crook of the elbow, with the person's arms crooked with the forearms horizontal but not on any armrests of the chair. The apparatus is then moved over the keyboard which is raised or lowered until the tip of the arm 33 just rests on the home keys, that is the A-S-D-F J-K-L-; row. In this position the person's forearms will normally be nearly perfectly horizontal during keyboarding, for maximum comfort.

Of course the adjustments thus set are not absolute and some minor variations are possible without departing from the scope of the invention. The point of the invention is that it is possible with the apparatus to set the chair and keyboard at a height which is most likely to be ideal from a ergonomic point of view, so that it should be starting from this setting that a person should vary the adjustment.

The angle and height of the monitor of the person whose chair and keyboard are adjusted according to this invention are adjusted by the apparatus described in my copending and jointly filed application Ser. No. 947,912 filed Dec. 29, 1986.

I claim:

1. An apparatus for setting the height of a desk chair for a person, the apparatus comprising:
    a base adapted to stand on the floor;
    a guide fixed to and extending vertically up from the base;
    a support vertically slidable in the guide;
    clamp means for arresting the support in the guide at any of a multiplicity of vertically offset positions therealong;
    a rigid arm extending horizontally from the support and having an outer end; and
    a dependent gauge element displaceable between a horizontal position nested in the arm and a vertical position depending straight down from the arm outer end and having a lower end 1 in to 2 in below the outer end of the arm in the vertical position.

2. The height-setting apparatus defined in claim 1 wherein the arm has an inner end and the support has an upper end provided with an arm pivot connecting it to the inner arm end, the arm being pivotal at its arm pivot between a use position generally perpendicular to the post and a storage position aligned therewith and nested therein.

3. The height-setting apparatus defined in claim 2 wherein the guide includes a pair of guide rails and the support is a bar vertically slidable between the rails, the arm being between the rails in the storage position.

4. The height-setting apparatus defined in claim 3 wherein the bar has a lower end provided with the clamp means.

5. The height-setting apparatus defined in claim 4 wherein the clamp means includes a spring-loaded pressure pad normally bearing in one direction against the rails and effectively pressing the lower end of the bar in the opposite direction against the rails.

6. The height-setting apparatus defined in claim 5 wherein the rails are of C-section and open toward each other, the bar being engaged between the rails.

7. The height-setting apparatus defined in claim 1 wherein the outer arm end is formed with an outwardly open notch having a beveled base, the gauge element having a beveled end complementarily engageable with the base, the gauge element substantially filling the notch with the beveled end and base in flat engagement in the horizontal position.

8. The height-setting apparatus defined in claim 7 wherein the arm outer end is provided with a pivot and the gauge element has an end opposite its beveled end that is connected to the pivot of the arm outer end.

9. A method of setting the height of a desk chair for a person using an apparatus comprising:
- a base adapted to stand on the floor;
- a guide fixed to and extending vertically up from the base;
- a support vertically slidable in the guide;
- clamp means for arresting the support in the guide at any of a multiplicity of vertically offset positions therealong;
- a rigid arm extending horizontally from the support and having an outer end; and
- a dependent gauge element displaceable between a horizontal position nested in the arm and a vertical position depending straight down from the arm outer end and having a lower end 1 in to 2 in below the outer end of the arm in the vertical position; the method comprising the steps of sequentially:

setting the base on the floor adjacent the person whose chair is to be set with the element in the horizontal nested position;

releasing the clamp means, vertically displacing the support until the arm outer end is substantially level with the center of the kneecap of the person, and then engaging the clamp means to lock the support in the guide;

displacing the gauge element into the vertical depending position and putting the front edge of the seat of the chair to be adjusted under the outer end of the arm, all without changing the setting of the support in the guide; and vertically displacing the seat of the chair until its front edge just engages the depending tip of the element.

* * * * *